(12) United States Patent
Reddy et al.

(10) Patent No.: US 12,737,132 B2
(45) Date of Patent: Sep. 15, 2026

(54) METHOD AND DEVICE FOR MANAGING RESOURCE ALLOCATION IN SOLID-STATE DRIVE

(71) Applicant: SAMSUNG ELECTRONICS CO., LTD., Suwon-si (KR)

(72) Inventors: Sreenivasa Reddy, Bengaluru (IN); Kaushal Kishor Yadav, Bengaluru (IN); Saugata Das Purkayastha, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/064,032

(22) Filed: Feb. 26, 2025

(65) Prior Publication Data

US 2026/0154003 A1 Jun. 4, 2026

(30) Foreign Application Priority Data

Dec. 4, 2024 (IN) .............................. 202411095617
Feb. 12, 2025 (IN) .............................. 202411095617

(51) Int. Cl.
*G06F 3/06* (2006.01)

(52) U.S. Cl.
CPC .......... *G06F 3/0631* (2013.01); *G06F 3/0604* (2013.01); *G06F 3/061* (2013.01); *G06F 3/0634* (2013.01); *G06F 3/0679* (2013.01)

(58) Field of Classification Search
CPC .... G06F 3/0631; G06F 3/0604; G06F 3/0679; G06F 3/061; G06F 3/0634
See application file for complete search history.

(56) References Cited

U.S. PATENT DOCUMENTS 9,077,579 B1 7/2015 Chu et al.
11,403,011 B1 8/2022 Gunda et al.
2022/0083222 A1 3/2022 Numata et al.
2023/0096111 A1* 3/2023 Kim ...................... G06F 3/0656 711/154
2024/0184488 A1 6/2024 Onorato et al.

FOREIGN PATENT DOCUMENTS

WO WO-2019194936 A1 * 10/2019 ............. G06F 3/067

OTHER PUBLICATIONS

Communication issued Sep. 15, 2025 by the European Patent Office in European patent Application No. 25164707.9.

* cited by examiner

*Primary Examiner* — Reginald G Bragdon
*Assistant Examiner* — Zakaria Mohammed Belkhayat
(74) *Attorney, Agent, or Firm* — Sughrue Mion, PLLC

(57) ABSTRACT

A method for managing resource allocation in solid-state drive (SSD) may include obtaining an activation request to switch to a prolonged read mode, wherein the activation request indicates an amount of required additional read resources, and based on the SSD being in a default mode and the activating request being obtained, determining whether the SSD has a number of available write resources for conversion into the additional read resources, and activating the prolonged read mode on the SSD, based on the number of available write resources for the conversion into the additional read resources.

17 Claims, 4 Drawing Sheets

METHOD AND DEVICE FOR MANAGING RESOURCE ALLOCATION IN SOLID-STATE DRIVE

CROSS-REFERENCE TO RELATED APPLICATIONS

This application claims priority from Indian Patent Application No. 202411095617, filed on Dec. 4, 2024, and Indian Patent Application No. 202411095617 filed on Feb. 12, 2025, in the Indian Patent Office, the disclosures of which are incorporated herein by reference in their entireties.

BACKGROUND

Embodiments of the present disclosure relate to memory devices, and more particularly relates to a method and a device for managing resource allocation in solid-state drives (SSDs).

NAND flash-based storage devices, such as Solid-State Drives (SSDs), and Universal Flash Storage (UFS), have become common in modern computing systems. These storage solutions are widely employed across a diverse range of applications, including consumer electronics, enterprise servers, and data centers. Regardless of the specific application requirements, SSD hardware is traditionally reserved for both read and write operations, with distinct resources allocated to each task.

In many use cases, such as Machine Learning (ML) applications, the majority of operations performed on storage devices are read-intensive. ML workloads, particularly those involving deep learning models, require the retrieval of large datasets from storage to be processed by graphic processor unit (GPUs), or other accelerators. Despite SSDs'ability to quickly retrieve data, performance bottlenecks still occur in scenarios where storage is not fully optimized.

One common issue arises when all available SSD read resources are consumed by the constant flow of data reads. In such a case, the SSD must wait for read resources to become available before the SSD can continue serving data requests. This waiting time, referred to as data stalls, directly impacts the throughput of ML applications, despite the fact that the write resources on the SSD remain underutilized. In such situations, the SSD's read performance is unnecessarily constrained, while write resources, which could potentially be repurposed, remain idle.

These data stalls during ingestion may substantially delay training and model inference times, especially in deep learning models that require vast amounts of data to be accessed and processed in real time. As a result, improving the efficiency of SSD resource utilization is crucial, particularly for applications with read-heavy workloads, such as ML training and inference.

SUMMARY

One or more embodiments of the present disclosure provide a device and a method for managing resource allocation in a solid-state drive (SSD). The device and the method may optimize the use of SSD resources during data processing, reduce wait times for read resources, and enhance read performance.

According to an aspect of the present disclosure, a method for managing resource allocation in a solid-state drive (SSD) may include: obtaining an activation request to switch to a prolonged read mode, wherein the activation request indicates an amount of required additional read resources; and based on the SSD being in a default mode and the activating request being obtained: determining whether the SSD has a number of available write resources to be converted into the additional read resources, and activating the prolonged read mode on the SSD, based on the number of available write resources for conversion into the additional read resources.

According to an aspect of the present disclosure, a solid-state drive (SSD) device may include: a memory storing instructions; and one or more processors configured to execute the instructions to: obtain an activation request to switch to a prolonged read mode, wherein the activation request indicates an amount of required additional read resources; and based on the SSD being in a default mode and the activating request being obtained: determine whether the SSD has a number of available write resources to be converted into the additional read resources; and activate the prolonged read mode on the SSD, based on the number of write available resources for conversion to the additional read resources.

A non-transitory computer readable storage medium may instructions to be executed by at least one processor to perform a method for managing resource allocation in a solid-state drive (SSD). The method may include: obtaining an activation request that indicates an amount of additional read resources required, based on read resources required for a given task exceeding originally available read resources; switching from a default mode of the SSD to a prolonged read mode of the SSD based on the activation request by determining available write resources of the SSD for conversion into the additional read resources, and allocating the available write resources as the additional read resources for the given task; and executing the given task based on the originally available read resources and the additional read resources.

BRIEF DESCRIPTION OF DRAWINGS

The above and/or other aspects will be more apparent by describing certain example embodiments, with reference to the accompanying drawings, in which.

DETAILED DESCRIPTION

Figure 1:
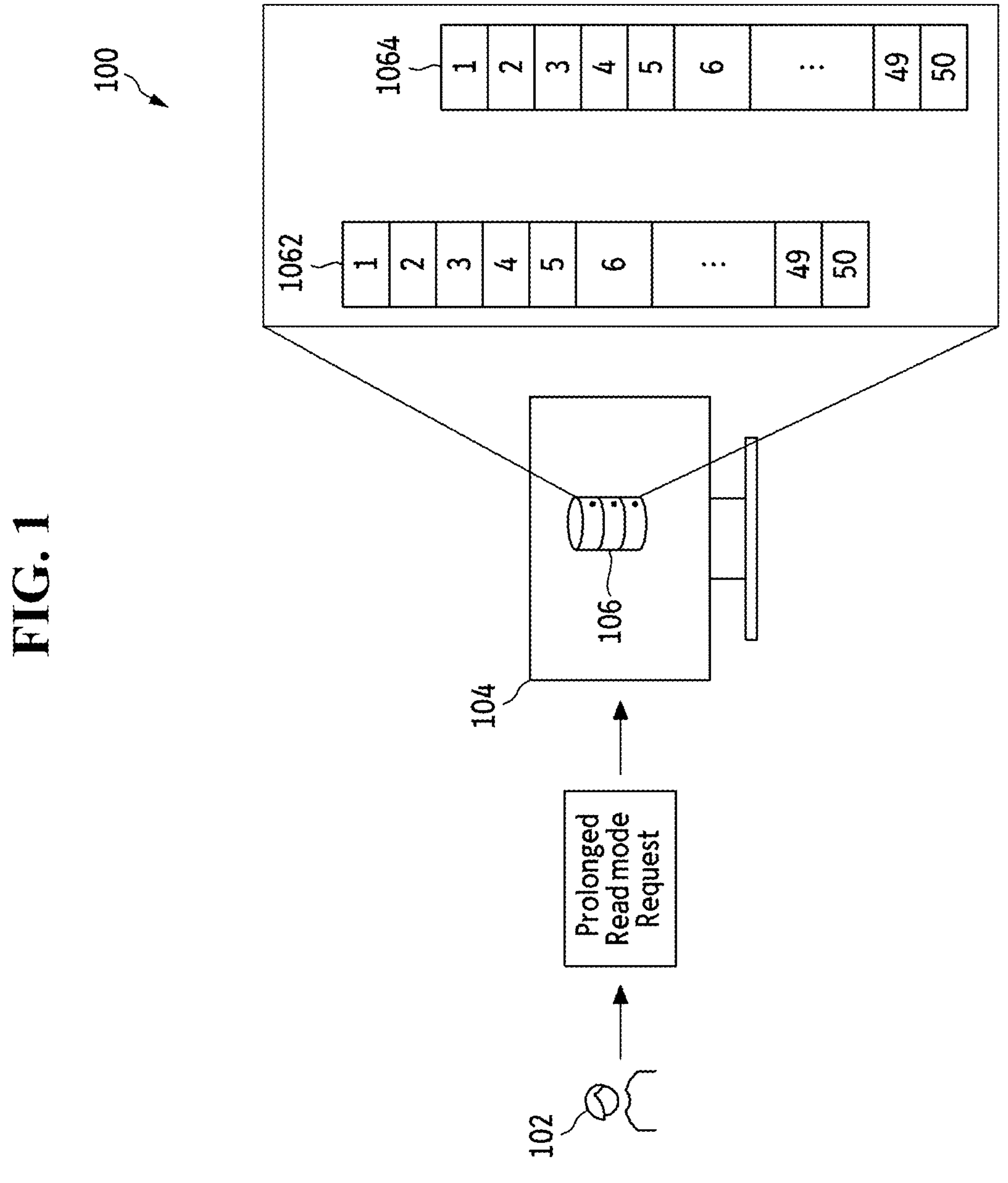
FIG. 1 is an environment depicting allocation of available write resources to read resources, according to one or more embodiments.

Example embodiments are described in greater detail below with reference to the accompanying drawings.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiments thereof have been shown by way of example in the drawings and will be described in detail below. It should be understood, however, that it is not intended to limit the disclosure to the particular forms disclosed, but on the contrary, the disclosure is to cover all modifications, equivalents, and alternatives falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

In the following detailed description of the embodiments of the disclosure, reference is made to the accompanying drawings that form a part hereof, and which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 is an environment depicting allocation of available write resources to read resources, according to one or more embodiments.

The environment 100 may include a host 102, a computing device 104, and a solid-state drive (SSD) 106 located within the computing device 104. In an embodiment of the present disclosure, the solid-state drive 106 may be located outside of the computing device 104 and the solid-state drive 106 may be connected to the computing device 104 by any method known to a person skilled in the art. Further, the solid-state drive 106 may include write resources 1062 and read resources 1064.

The write resources 1062 and read resources 1064 in a default mode may include a default number of resources allocated to the SSD 106. The host 102 utilizes the computing device 104 for various types of usage. The requirement of the resources of the SSD 106 may vary depending on the type of usage of the host 102. The default number of write resources 1062 and read resources 1064 of the SSD 106 in the default mode may be in any proportion as predefined by the host 102.

If the host 102 is utilizing the computing device 104 to run large machine learning models, the requirement for read resources 1064 may be higher than for the write resources 1062. Once all available resources are utilized, the computing device 104 waits for utilized resources to be freed. In this scenario, the computing device 104 waits for the read resources 1064 to become available, even though write resources 1062 are not utilized at all, as not all write resources are required by the computing device 104 at the same time.

In this situation, the host 102 may request the activation of a prolonged read mode of the SSD 106, or the computing device 104 may automatically activate the prolonged read mode when the required resources for running a task (e.g., executing a training or inference process of a machine learning model) exceed the available read resource 1064. The prolonged read mode of the SSD 106 may address the increased demand for read resources by temporarily converting some of the available write resources into the read resources 1064.

Figure 2:
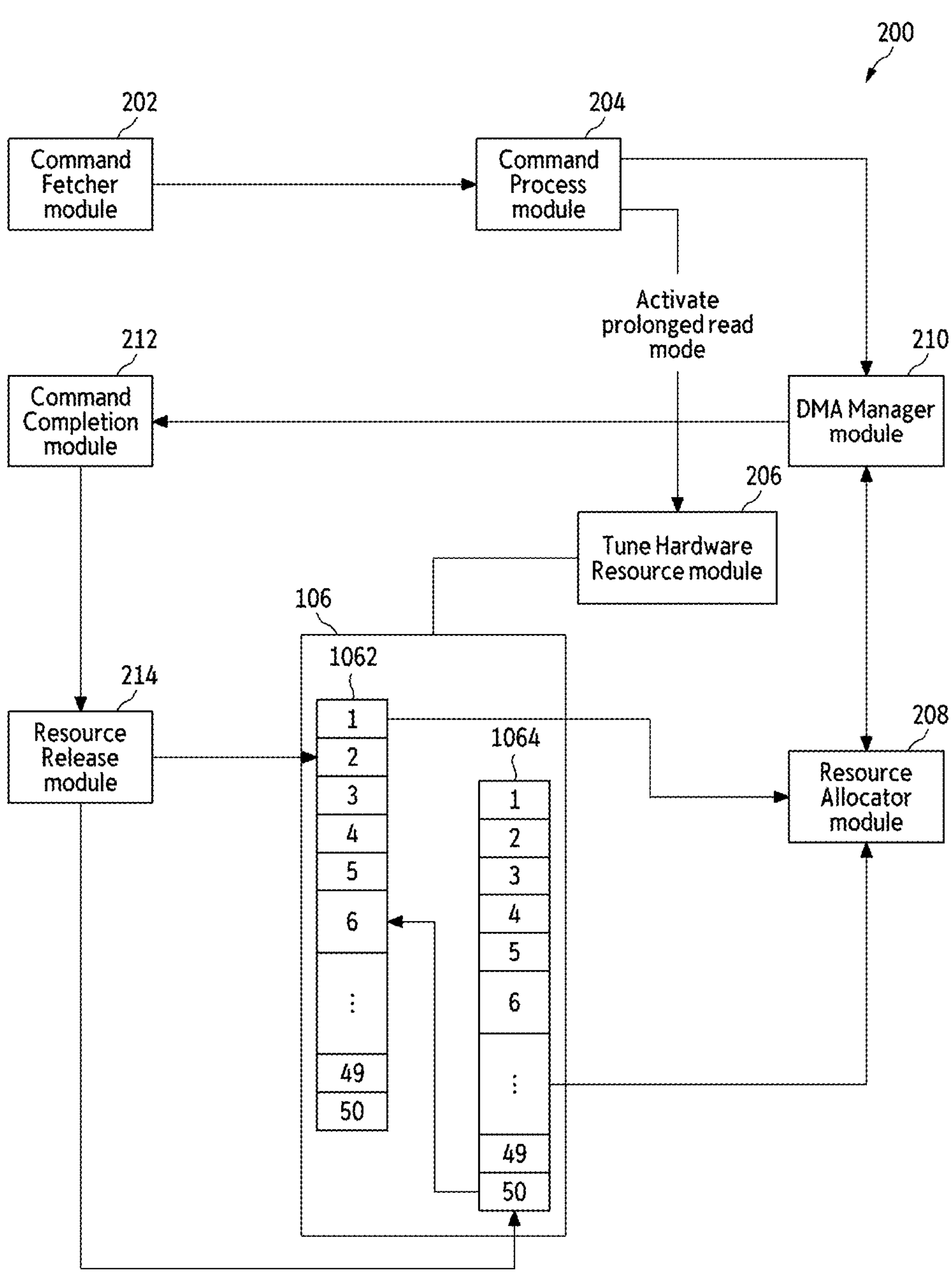
FIG. 2 is an architecture of a solid-state drive (SSD) device for managing resource allocation in SSD, according to one or more embodiments.

FIG. 2 is an architecture of a solid-state drive (SSD) device for managing resource allocation in SSD, according to one or more embodiments.

The architecture block diagram 200 includes a command fetcher module 202, a command process module 204, a tune hardware resource module 206, a resource allocator module 208, a direct memory access (DMA) manager module 210, a command completion module 212, a resource release module 214, and write resources 1062 and read resources 1064 within SSD 106.

The command fetcher module 202 is a controller whose function is to fetch/retrieve requests from the host 102. All different types of requests and commands from the host 102 are received by the command fetcher module 202. The command fetcher module 202 then provides the requests to the command process module 204 and the command process module 204 then process the request.

The command process module 204 may identify the purpose of each request. The command process module 204 may identify the request as a prolonged read mode request and forward the same to the DMA manager module 210 and the tune hardware resource module 206. In an embodiment of the present disclosure, a plurality of SSDs may be present within a computing system. The command process module 204 identifies the corresponding SSD by processing the prolonged read mode request. In a non-limiting example, the prolonged read mode request may include a request to convert 90% of the available write resources 1062 into read resources 1064.

Tune hardware resource module 206 re-allocates the available write resources 1062 to the read resources 1064 based on the prolong read mode request. Continuing with the example, the tune hardware resource module 206 may convert 90% of the available write resources 1062 into read resources 1064. Specifically, all available write resources 1062 from 6-50 may be converted into read resources 1064. As a result, the read resources 1064 may now include the original read resources 1064 (1-50) and additional read resources derived from the converted write resources (6-50 of the available write resources).

The resource allocator module 208 stores an updated information of the resource re-allocation of the SSD 106. The resource allocator module 208 sends the updated information of the resource re-allocation to the DMA manager module 210.

The DMA manager module 210 may receive the prolonged read mode request from the command process module 204 and the updated information of the resource re-allocation from the resource allocator module 208. The DMA manager module 210 may then determine whether the resource re-allocation of the available write resources to read resources 1064 of the SSD 106 is correctly processed. The DMA manager module 210 then updates the command completion module 212 if the resource re-allocation of the available write resources to read resources 1064 of the SSD 106 is successfully processed.

The command completion module 212 receives the input from the DMA manager module 210 and updates the host 102 on the successful completion of the prolonged read mode request. The resource release module 214 receives the resource re-allocation information from the command completion module 212 as when the available write resources are allocated to read resources 1064, the computing device must know the starting address of the available write resources and the read resources 1064 as well as the ending address of the write and read resources. The resource release module 214 then release the available write resources and add the available write resources as additional read resources.

Further, the command fetcher module 202 may receive a request for deactivation of the prolonged read mode from the host 102. The command fetcher module 202 may then sends the deactivation prolonged read mode request to the command process module 204. The command process module 204 then process the requests and identify the type of the request and transmits the prolonged request to the corresponding tune hardware resource module 206 and DMA manager module 210.

Further, the command process module 204 identifies whether the prolonged read mode includes information specifying a duration for which the prolonged read mode should remain active. After the specified duration expires, the prolonged read mode is deactivated, hence automatically reverting the SSD to the default mode.

The tune hardware resource module 206 then reallocates the additional read resources to the write resources 1062 based on the default mode. The default mode of the SSD includes a default number of read and write resources. The resource allocator module 208 stores updated information regarding the resource re-allocation of the SSD 106. The resource allocator module 208 sends the updated information of the resource re-allocation to the DMA manager module 210.

The DMA manager module 210 may receive the deactivation prolonged read mode request from the command process module 204 and the updated information of the resource re-allocation from the resource allocator module 208. The DMA manager module 210 may then determine whether the default mode of the SSD is correctly processed. The DMA manager module 210 then updates the command completion module 212 if the default mode of the SSD is successfully processed.

The command completion module 212 receives the input from the DMA manager module 210 and updates the host 102 on the successful completion of the activation of default mode. The resource release module 214 receives the resource re-allocation information from the command completion module 212 as when the available write resources are allocated to read resources 1064, the computing device must know the starting address of the available write resources and the read resources 1064 as well as the ending address of the write and read resources. The resource release module 214 then releases the additional read resources and reallocates the additional read resources as write resources 1062.

Figure 3:
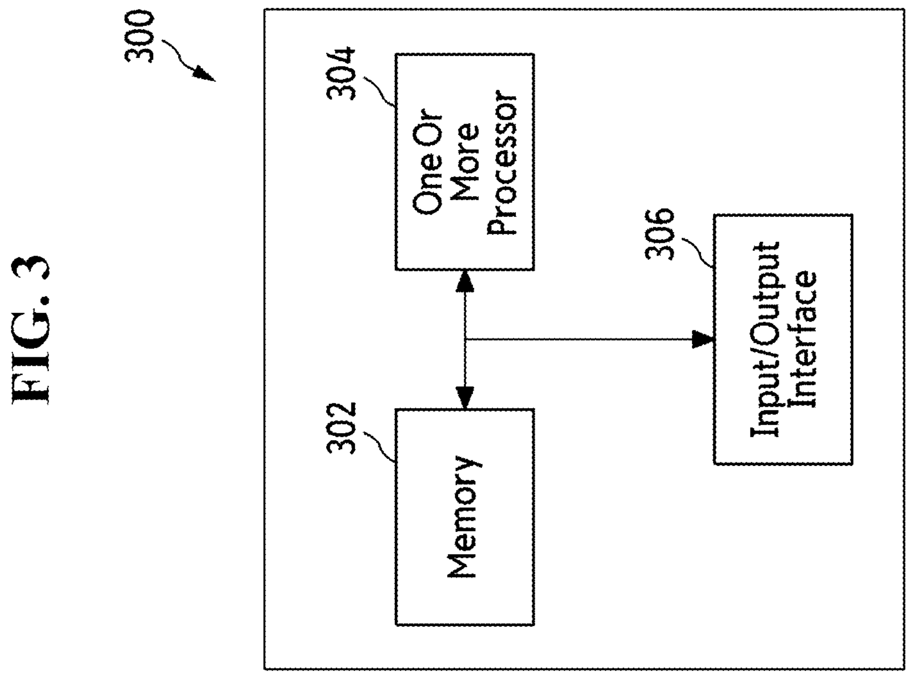
FIG. 3 shows a block diagram of a solid-state drive (SSD) device for managing resource allocation in SSD, according to one or more embodiments.

FIG. 3 shows a block diagram of a solid-state drive (SSD) device for managing resource allocation in SSD, according to one or more embodiments.

The solid-state drive (SSD) device 300 may include a memory 302, one or more processors 304 and an input/output (I/O) interface 306. In an embodiment of the present disclosure, the SSD device 300 may also implement a method for managing resource allocation in solid-state drive (SSD). In another embodiment of the present disclosure, the SSD device 300 itself implements a method for managing resource allocation in solid-state drive (SSD) with one or more custom fields in a computing device/electronic system/data processing unit/digital processing unit/control system by using one or more units configured within the SSD device 300, and the said one or more units are capable of implementing the features as disclosed in the present disclosure.

The I/O interface 306 connects the memory 302 and the one or more processors 304 to other system components, enabling efficient data transfer and communication.

It may be noted that, in some embodiments, the SSD device 300 may include more or fewer components than those depicted herein. The various components of the SSD device 300 may be implemented using hardware, software, firmware, and/or any combinations thereof. Further, the various components of the SSD device 300 may be operably coupled with each other. For example, various components of the SSD device 300 may be capable of communicating with each other using communication channel media (e.g., buses, interconnects, or the like).

In an embodiment, the one or more processors 304 may be embodied as a multi-core processor, a single core processor, or a combination of one or more multi-core processors and/or one or more single core processors. For example, the one or more processors 304 may be embodied as one or more of various processing devices, such as, but not limited to, a coprocessor, a microprocessor, a controller, a digital signal processor (DSP), a processing circuitry with or without an accompanying DSP, or various other processing devices including, a microcontroller (MCU), a hardware accelerator, a special-purpose computer chip, or the like.

In an embodiment, the memory 302 may be configured to store machine executable instructions, which may be referred to herein as instructions. In an embodiment, the one or more processors 304 may be embodied as an executor of software instructions. As such, the one or more processors 304 may be capable of executing the instructions stored in the memory 302 to perform one or more operations described herein.

The memory 302 may be any type of storage accessible to the one or more processors 304 to perform respective functionalities. For example, the memory 302 may include one or more volatile and/or non-volatile memories, or a combination thereof. For example, the memory 302 may be embodied as semiconductor memories, such as, but not limited to, flash memory, mask read-only memory (ROM), programmable ROM (PROM), erasable PROM (EPROM), random access memory (RAM), or the like.

The one or more processors 304 are configured to receive from a host 102 via I/O interface 306, a request to switch to a prolonged read mode. The request includes an amount of required additional read resources. In one non-limiting embodiment, the required additional read resources may be indicated by the host 102 in form of percentage of write resources required to be allocated to read resources to fulfill the requirement of the additional read resources.

The one or more processors 304 are configured to detect whether the SSD is in the default mode. Further the one or more processors 304 are configured to determine whether the SSD has a number of available write resources to be converted into additional read resources, in response to detection that the SSD is in the default mode.

In an embodiment of the present disclosure, the available write resources may indicate unused write resources of the SSD in the default mode. Further, the conversion of available write resources to the additional read resources is temporary and may be in effect as long as the prolonged read mode is activated.

The one or more processors 304 are configured to activate a prolonged read mode on the SSD, if the number of write resources are available for conversion to the additional read resources. In an embodiment of the present disclosure, the one or more processors are configured to switch a mode of the SSD from the default mode to the prolonged read mode and convert the number of available write resources into the additional read resources.

In an embodiment of the present disclosure, the one or more processors 304 are further configured to receive a request from the host 102 via I/O interface 306 for deactivation of the prolonged read mode from the host 102. The one or more processors 304 are then configured to switch a mode of the SSD from the prolonged read mode to the default mode and reallocate the read resources and the write resources based on the default mode. The default mode of the SSD includes a default number of read and write resources.

In one non-limiting embodiment of the present disclosure, the request for switching to a prolonged read mode may also specify a duration for which the prolonged read mode should remain active. Once the duration expired, the one or more processors 304 may be configured to deactivate the prolonged read mode, hence automatically reverting the SSD to the default mode. The memory 302 stores the requests of the host 102.

Thus, the SSD device 300 facilitates a technically advanced solution for managing resource allocation in SSDs. The SSD device 300 improves the resource efficiency by utilizing unused available write resources. Further, the SSD device 300 improves the overall performance by increasing the availability of read resources by bringing in additional read resources from the writes resources. The SSD device 300 manages the resources so efficiently that more resources are available to the host at any given time, thereby minimizing waiting periods when the resource pool is fully utilized.

Figure 4:
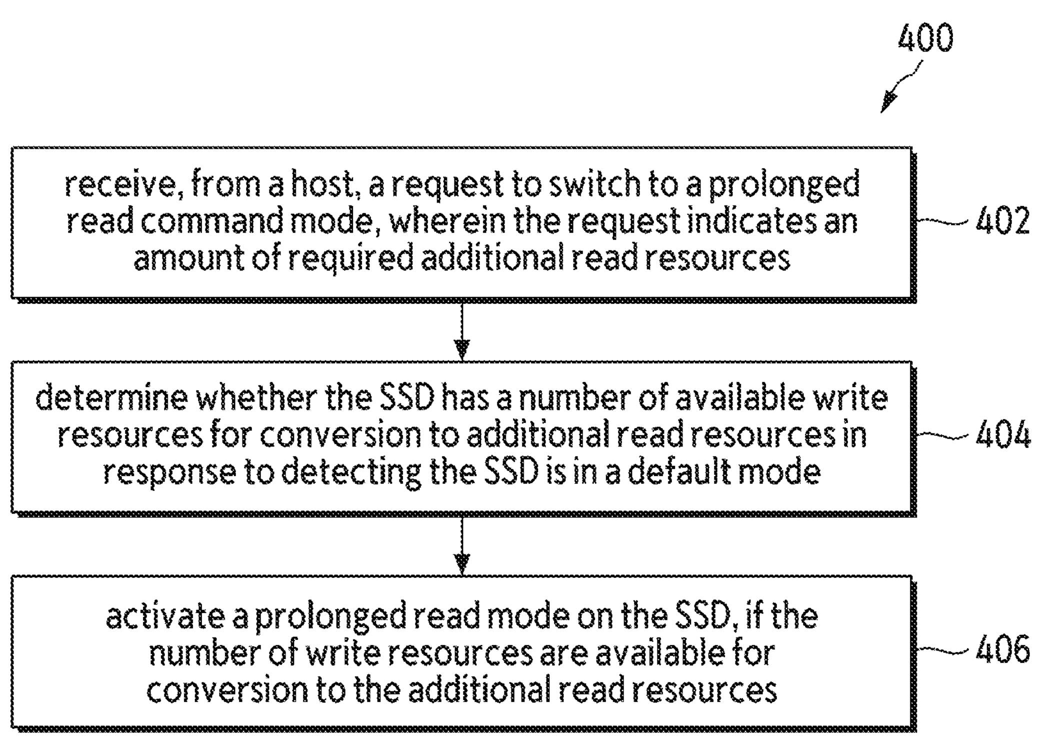
FIG. 4 shows a flowchart illustrating a method for managing resource allocation in solid-state drive (SSD), according to one or more embodiments.

FIG. 4 shows a flowchart illustrating a method for managing resource allocation in solid-state drive (SSD), according to one or embodiments.

At step 402, the method 400 includes receiving from a host, a request to switch to a prolonged read mode. The request indicates an amount of required additional read resources. In one non-limiting embodiment, the required additional read resources may be indicated by the host in form of percentage of write resources required to be allocated to read resources to order to meet the requirement of the additional read resources.

At step 404, the method 400 includes detecting whether the SSD is in the default mode. Further, the method 400 includes determining whether the SSD has a number of available write resources for conversion into the additional read resources, in response to detecting the SSD is in a default mode.

In an embodiment of the present disclosure, the available write resources may indicate unused write resources of the SSD in the default mode. Further, the conversion of available write resources into the additional read resources is temporary and may be in effect as long as the prolonged read mode is activated.

At step 406, the method 400 includes activating a prolonged read mode on the SSD, if the number of write resources are available for conversion to the additional read resources. In an embodiment of the present disclosure, the method includes switching a mode of the SSD from the default mode to the prolonged read mode and converting the available number of available write resources to the additional read resources.

In an embodiment of the present disclosure, the method further includes receiving a request for deactivation of the prolonged read mode from the host. The method then includes switching a mode of the SSD from the prolonged read mode to the default mode and reallocating the read resources and the write resources based on the default mode. The default mode of the SSD includes default number of read and write resources.

In one non-limiting embodiment of the present disclosure, the request for switching to the prolonged read mode may include a duration for which the prolonged read mode may remain activated. After the duration expires, the method 400 may include deactivating the prolonged read mode, hence automatically reverting the SSD to the default mode.

Thus, the method 400 facilitates a technically advanced solution for managing resource allocation in SSDs. The method 400 improves the resource efficiency by utilizing unused available write resources. Further, the method 400 improves the overall performance of the SSD by increasing the availability of read resources by bringing in additional read resources from the writes resources. The method 400 manages the resources so efficiently that more resources are available to the host at any given time, thereby minimizing waiting periods when the resource pool is fully utilized.

The sequence of operations of the methods at steps 402, 404 and 406 may not be necessarily executed in the same order as they are presented. Further, one or more operations may be grouped together and performed in form of a single step, or one operation may have several sub-steps that may be performed in a parallel and/or in a sequential manner.

Furthermore, one or more computer-readable storage media may be utilized in implementing embodiments consistent with the present disclosure. A computer-readable storage medium may refer to any type of physical memory on which information and/or data that may be readable by a processor may be stored. Thus, a computer-readable storage medium may store instructions for execution by one or more processors, including instructions for causing the one or more processors to perform steps or stages consistent with the embodiments described herein. The term "computer-readable medium" may be understood to include tangible items and exclude carrier waves and transient signals, e.g., may be non-transitory. Examples may include, but may not be limited to, RAM, ROM, volatile memory, non-volatile memory, hard drives, compact disc (CD) ROMs (CD-ROMs), digital versatile drives (DVDs), flash drives, disks, other physical storage media, or the like.

According to an aspect of the disclosure, a method for managing resource allocation in solid-state drive (SSD) may include: obtaining an activation request to switch to a prolonged read mode, wherein the activation request indicates an amount of required additional read resources; and based on the SSD being in a default mode and the activating request being obtained: determining whether the SSD has a number of available write resources to be converted into the additional read resources, and activating the prolonged read mode on the SSD, based on the number of available write resources for conversion into the additional read resources.

The prolonged read mode may be activated by switching a mode of the SSD from the default mode to the prolonged read mode, and converting the number of available write resources to the additional read resources.

The method for managing resource allocation in the SSD may further include: receiving a deactivation request to deactivate the prolonged read mode; switching a mode of the SSD from the prolonged read mode to the default mode based on the deactivation request; and reallocating the write resources based on the default mode indicating a default number of read and write resources.

The activation requests may indicate a duration for which the prolonged read mode should remain active, and the method may further include automatically reverting the SSD to the default mode and releasing the writes resources converted into the additional read resources when the duration expires.

The activation request may include a requested percentage of the available write resources to be converted into the additional read resources, and the activating the prolonged read mode may include allocating the requested percentage of the available write resources to the additional read resources.

The obtaining the activation request may include obtaining the activation request through an input and output interface.

The obtaining the activation request may include obtaining the activation request that is automatically generated based on resources required to execute a given task exceeding available read resources.

According to another aspect of the disclosure, a solid-state drive (SSD) device may include a memory storing instructions, and one or more processors configured to execute the instructions to: obtain an activation request to switch to a prolonged read mode, wherein the activation request indicates an amount of required additional read resources; and based on the SSD being in a default mode and the activating request being obtained: determine whether the SSD has a number of available write resources to be converted into the additional read resources, and activate the prolonged read mode on the SSD, based on the number of write available resources for conversion to the additional read resources.

To activate the prolonged read mode on the SSD, the one or more processors may switch a mode of the SSD from the default mode to the prolonged read mode, and convert the available number of available write resources to the additional read resources.

The one or more processors may detect whether the SSD is in the default mode.

The one or more processors may receive a deactivation request to deactivate the prolonged read mode, switch a mode of the SSD from the prolonged read mode to the default mode based on the deactivation request, and reallocate the write resources based on the default mode indicating a default number of read and write resources.

The activation request may indicate a duration for which the prolonged read mode should remain active, and the one or more processors are configured to: automatically revert the SSD to the default mode and releasing the writes resources converted into the additional read resources when the duration expires.

The activation requests may indicate a requested percentage of the available write resources to be converted into the additional read resources, and the one or more processors are configured to allocate the requested percentage of the available write resources to the additional read resources.

The SSD device may include an input and output interface. The one or more processors may receive the activation request through the input and output interface.

The one or more processors may automatically generate the activation request based on resources required to execute a given task exceeding available read resources.

According to another aspect of the disclosure, a non-transitory computer readable storage medium storing instructions to be executed by at least one processor may be provided to perform a method for managing resource allocation in a solid-state drive (SSD). The method may include obtaining an activation request that indicates an amount of additional read resources required, based on read resources required for a given task exceeding originally available read resources; switching from a default mode to a prolonged read mode in the SSD based on the activation request by determining available write resources of the SSD for conversion into the additional read resources, and allocating the available write resources as the additional read resources for the given task; and executing the given task based on the originally available read resources and the additional read resources.

It may be understood by those within the art that, in general, terms used herein, and are generally intended as "open" terms (e.g., the term "including" may be interpreted as "including but not limited to," the term "having" may be interpreted as "having at least," the term "includes" may be interpreted as "includes but is not limited to," and the like). For example, as an aid to understanding, the detail description may contain usage of the introductory phrases "at least one" and "one or more" to introduce recitations. However, the use of such phrases may not be construed to imply that the introduction of a recitation by the indefinite articles "a" or "an" limits any particular part of description containing such introduced recitation to disclosure containing only one such recitation, even when the introductory phrases "one or more" or "at least one" and indefinite articles such as "a" or "an" (e.g., "a" and/or "an" may typically be interpreted to mean "at least one" or "one or more") are included in the recitations; the same holds true for the use of definite articles used to introduce such recitations. In addition, even if a specific part of the introduced description recitation is explicitly recited, those skilled in the art will recognize that such recitation may typically be interpreted to mean at least the recited number (e.g., the bare recitation of "two recitations," without other modifiers, typically means at least two recitations or two or more recitations).

While various aspects and embodiments have been disclosed herein, other aspects and embodiments may be apparent to those skilled in the art. The various aspects and embodiments disclosed herein are for purposes of illustration and are not intended to be limiting, with the scope and spirit being indicated by the foregoing detailed description.

What is claimed is:

1. A method for managing resource allocation in a solid-state drive (SSD), the method comprising:

obtaining an activation request to switch to a prolonged read mode, wherein the activation request indicates an amount of required additional read resources; and based on the SSD being in a default mode and the activation request being obtained:

determining whether the SSD has a number of available write resources to be converted into the additional read resources, and activating the prolonged read mode on the SSD, based on the number of available write resources for conversion into the additional read resources.

2. The method as claimed in claim 1, wherein the activating the prolonged read mode on the SSD comprises:

switching a mode of the SSD from the default mode to the prolonged read mode; and converting the number of available write resources to the additional read resources.

3. The method as claimed in claim 1, further comprising: detecting whether the SSD is in the default mode.

4. The method as claimed in claim 1, further comprising: receiving a deactivation request to deactivate the prolonged read mode;

switching a mode of the SSD from the prolonged read mode to the default mode based on the deactivation request; and reallocating the write resources based on the default mode indicating a default number of read and write resources.

5. The method as claimed in claim 1, wherein the activation request indicates a duration for which the prolonged read mode should remain active, and the method further comprises:

automatically reverting the SSD to the default mode and releasing the write resources converted into the additional read resources when the duration expires.

6. The method as claimed in claim 1, wherein the activation request indicates a requested percentage of the available write resources to be converted into the additional read resources, and the activating the prolonged read mode comprises:

allocating the requested percentage of the available write resources to the additional read resources.

7. The method as claimed in claim 1, wherein the obtaining the activation request comprises:

obtaining the activation request through an input and output interface.

8. The method as claimed in claim 1, wherein the activation request is automatically generated based on resources required to execute a given task exceeding available read resources.

9. A solid-state drive (SSD) device comprising:

a memory storing instructions; and one or more processors configured to execute the instructions to:

obtain an activation request to switch to a prolonged read mode, wherein the activation request indicates an amount of required additional read resources; and based on the SSD being in a default mode and the activation request being obtained:

determine whether the SSD has a number of available write resources to be converted into the additional read resources; and activate the prolonged read mode on the SSD, based on the number of available write resources for conversion to the additional read resources.

10. The SSD device as claimed in claim 9, wherein to activate the prolonged read mode on the SSD, the one or more processors are configured to:

switch a mode of the SSD from the default mode to the prolonged read mode; and convert the number of available write resources to the additional read resources.

11. The SSD device as claimed in claim 9, wherein the one or more processors are further configured to:

detect whether the SSD is in the default mode.

12. The SSD device as claimed in claim 9, wherein the one or more processors are further configured to:

receive a deactivation request to deactivate the prolonged read mode;

switch a mode of the SSD from the prolonged read mode to the default mode based on the deactivation request; and reallocate the write resources based on the default mode indicating a default number of read and write resources.

13. The SSD device as claimed in claim 9, wherein the activation request indicates a duration for which the prolonged read mode should remain active, and the one or more processors are configured to:

automatically revert the SSD to the default mode and release the write resources converted into the additional read resources when the duration expires.

14. The SSD device as claimed in claim 9, wherein the activation request indicates a requested percentage of the available write resources to be converted into the additional read resources, and the one or more processors are configured to:

allocate the requested percentage of the available write resources to the additional read resources.

15. The SSD device as claimed in claim 9, further comprising an input and output interface, wherein the one or more processors are configured to receive the activation request through the input and output interface.

16. The SSD device as claimed in claim 9, wherein the one or more processors are configured to:

automatically generate the activation request based on resources required to execute a given task exceeding available read resources.

17. A non-transitory computer readable storage medium storing instructions to be executed by at least one processor to perform a method for managing resource allocation in a solid-state drive (SSD), the method comprising:

obtaining an activation request that indicates an amount of additional read resources required, based on read resources required for a given task exceeding originally available read resources;

switching from a default mode to a prolonged read mode in the SSD based on the activation request by determining available write resources of the SSD for conversion into the additional read resources, and allocating the available write resources as the additional read resources for the given task; and executing the given task based on the originally available read resources and the additional read resources.

* * * * *